(12) United States Patent
Jung et al.

(10) Patent No.: US 11,212,821 B2
(45) Date of Patent: Dec. 28, 2021

(54) METHOD AND APPARATUS FOR CANCELLING TRANSMISSION BASED ON OVERLAPPING TRANSMISSION OCCASIONS

(71) Applicant: Lenovo (Singapore) Pte. Ltd., New Tech Park (SG)

(72) Inventors: Hyejung Jung, Northbrook, IL (US); Vijay Nangia, Woodridge, IL (US); Hossein Bagheri, Urbana, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 16/833,674

(22) Filed: Mar. 30, 2020

(65) Prior Publication Data

US 2020/0322971 A1 Oct. 8, 2020

Related U.S. Application Data

(60) Provisional application No. 62/828,463, filed on Apr. 2, 2019.

(51) Int. Cl.
*H04W 72/12* (2009.01)

(52) U.S. Cl.
CPC ... *H04W 72/1242* (2013.01); *H04W 72/1268* (2013.01); *H04W 72/1289* (2013.01)

(58) Field of Classification Search
CPC ... H04W 12/10; H04W 28/02; H04W 28/065; H04W 72/1252; H04W 72/1268; H04W 72/1284; H04W 80/02; H04W 80/06; H04W 28/06; H04W 72/12
USPC ............................................ 370/330
See application file for complete search history.

(56) References Cited

U.S. PATENT DOCUMENTS

| 2018/0070341 A1* | 3/2018 | Islam | H04L 1/1887 |
|---|---|---|---|
| 2018/0192417 A1* | 7/2018 | Yin | H04L 5/005 |
| 2018/0279291 A1* | 9/2018 | Tiirola | H04B 1/713 |
| 2019/0116007 A1* | 4/2019 | Yi | H04W 56/00 |
| 2019/0306923 A1* | 10/2019 | Xiong | H04W 72/042 |
| 2019/0349960 A1* | 11/2019 | Li | H04W 72/1242 |

(Continued)

FOREIGN PATENT DOCUMENTS

WO 2018/129081 7/2018

OTHER PUBLICATIONS

Koukourlis, International Search Report, International Application No. PCT/IB2020/053036, European Patent Office, Rijswijk, NL, dated Jun. 15, 2020.

(Continued)

*Primary Examiner* — Nathan S Taylor
(74) *Attorney, Agent, or Firm* — Loppnow & Chapa; Matthew C. Loppnow

(57) ABSTRACT

A first transmission occasion and a first priority of a first uplink channel can be determined. A second transmission occasion and a second priority of a second uplink channel can be determined. The first priority can be higher than the second priority. The first transmission occasion can overlap in time with the second transmission occasion. A particular symbol of the second uplink channel to cancel the transmission of the second uplink channel can be determined based on the first transmission occasion overlapping in time with the second transmission occasion. The transmission of the second uplink channel from the particular symbol can be cancelled.

18 Claims, 4 Drawing Sheets

(56) References Cited

U.S. PATENT DOCUMENTS

| | | | | |
|---|---|---|---|---|
| 2019/0379489 | A1* | 12/2019 | Hwang | H04L 5/0055 |
| 2020/0022161 | A1* | 1/2020 | Yang | H04W 72/0413 |
| 2020/0068599 | A1* | 2/2020 | Yang | H04L 5/0055 |
| 2020/0077470 | A1* | 3/2020 | Xiong | H04L 1/1854 |
| 2020/0196343 | A1* | 6/2020 | Marinier | H04L 1/1854 |
| 2020/0229202 | A1* | 7/2020 | Bagheri | H04W 72/1242 |
| 2020/0259601 | A1* | 8/2020 | Zhou | H04L 5/0085 |
| 2020/0344032 | A1* | 10/2020 | Yang | H04L 5/0007 |
| 2021/0037388 | A1* | 2/2021 | Johansson | H04W 12/122 |
| 2021/0112587 | A1* | 4/2021 | Papasakellariou | H04L 5/00 |

OTHER PUBLICATIONS

Huawei et al: "UL Multiplexing for URLLC", 3GPP Draft; R1-1806893, 3rd Generation Partnership Project (3GPP), Mobile Compei Ence Centre; 650, Route Des Lucioles ; F-06921 Sophia-Antipolis Cedex ; France vol. RAN WG1, No. Busan, Korea; May 21-25, 2018 May 20, 2018.

Huawei et al.: "Discussion on partially overlapped PUCCH and PUSCH for URLLC", 3GPP Draft; R1-1804297, 3rd Generation Partnership Project (3GPP), Mobile Competence Centre; 650, Route Des Lucioles ; F-06921 Sophia-Antipolis Cedex; France, vol. RAN WG1, No. Sanya, China; Apr. 16-20, 2018 Apr. 15, 2018.

Sharp: "PUCCH considerations for URLLC", 3GPP Draft; R1-1705476, 3rd Generation Partnership Project (3GPP), Mobile Competence Centre; 650, Route Des Lucioles ; F-06921 Sophia-Antipolis Cedex; France, vol. RAN WG1, No. Spokane, USA; Apr. 3-7, 2017 Apr. 2, 2017.

OPPO: "Offline summary on UCI enhancements for URLLC", 3GPP Draft; R1-1814273, 3rd Generation Partnership Project (3GPP), Mobile Competence Centre; 650, Route Des Lucioles ; F-06921 Sophia-Antipolis Cedex; France, vol. RAN WG1, No. Spokane, USA; Nov. 12-16, 2018 Nov. 19, 2018.

3GPP, 3rd Generation Partnership Project; Technical Specification Group Radio Access Network; NR; Physical channels and modulation (Release 15), 3GPP TS 38.211 V15.5.0 (Mar. 2019), Valbonne—France.

3GPP, 3rd Generation Partnership Project; Technical Specification Group Radio Access Network; NR; Physical layer procedures for control (Release 15), 3GPP TS 38.213 V15.5.0 (Mar. 2019), Valbonne—France.

3GPP, 3rd Generation Partnership Project; Technical Specification Group Radio Access Network; NR; Physical layer procedures for data (Release 15), 3GPP TS 38.214 V15.5.0 (Mar. 2019), Valbonne—France.

\* cited by examiner

METHOD AND APPARATUS FOR CANCELLING TRANSMISSION BASED ON OVERLAPPING TRANSMISSION OCCASIONS

BACKGROUND

1. Field

The present disclosure is directed to a method and apparatus for communicating on a wireless network. More particularly, the present disclosure is directed to cancelling transmission based on overlapping transmission occasions.

2. Introduction

Presently, wireless communication devices, such as User Equipment (UE), communicate with other communication devices using wireless signals. In Third Generation Partnership Project (3GPP) Release 15 New Radio (NR), a basic support for Ultra-Reliable and Low-Latency Communication (URLLC) was introduced with transmission time interval (TTI) structures for low latency as well as methods for improved reliability. For example, non-slot (i.e. mini-slot, e.g. 2, 4, or 7 symbols whose duration is shorter than a slot duration of 14 symbols) based scheduling and transmission of Physical Downlink Shared Channel (PDSCH)/Physical Uplink Shared Channel (PUSCH) are allowed, and PDSCH/PUSCH slot aggregation (i.e. repetition of PDSCH/PUSCH over multiple slots) is supported. Further use cases with tighter latency and reliability requirements have been identified. One further use can include Release 15 enabled use case improvements including Augmented Reality (AR) and Virtual Reality (VR). Other future use case can include new Release 16 use cases with higher requirements for factory automation, transport industry, and electrical power distribution.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for communicating on a wireless network. At least some embodiments can provide methods to transmit uplink control information in ultra-reliable low-latency communication. At least some embodiments can cancel transmission based on overlapping transmission occasions.

According to a possible embodiment, a first transmission occasion and a first priority of a first uplink channel can be determined. A second transmission occasion and a second priority of a second uplink channel can be determined. The first priority can be higher than the second priority. The first transmission occasion can overlap in time with the second transmission occasion. A particular symbol of the second uplink channel to cancel a transmission of the second uplink channel can be determined based on the first transmission occasion overlapping in time with the second transmission occasion. The transmission of the second uplink channel from the particular symbol can be cancelled.

Figure 1:
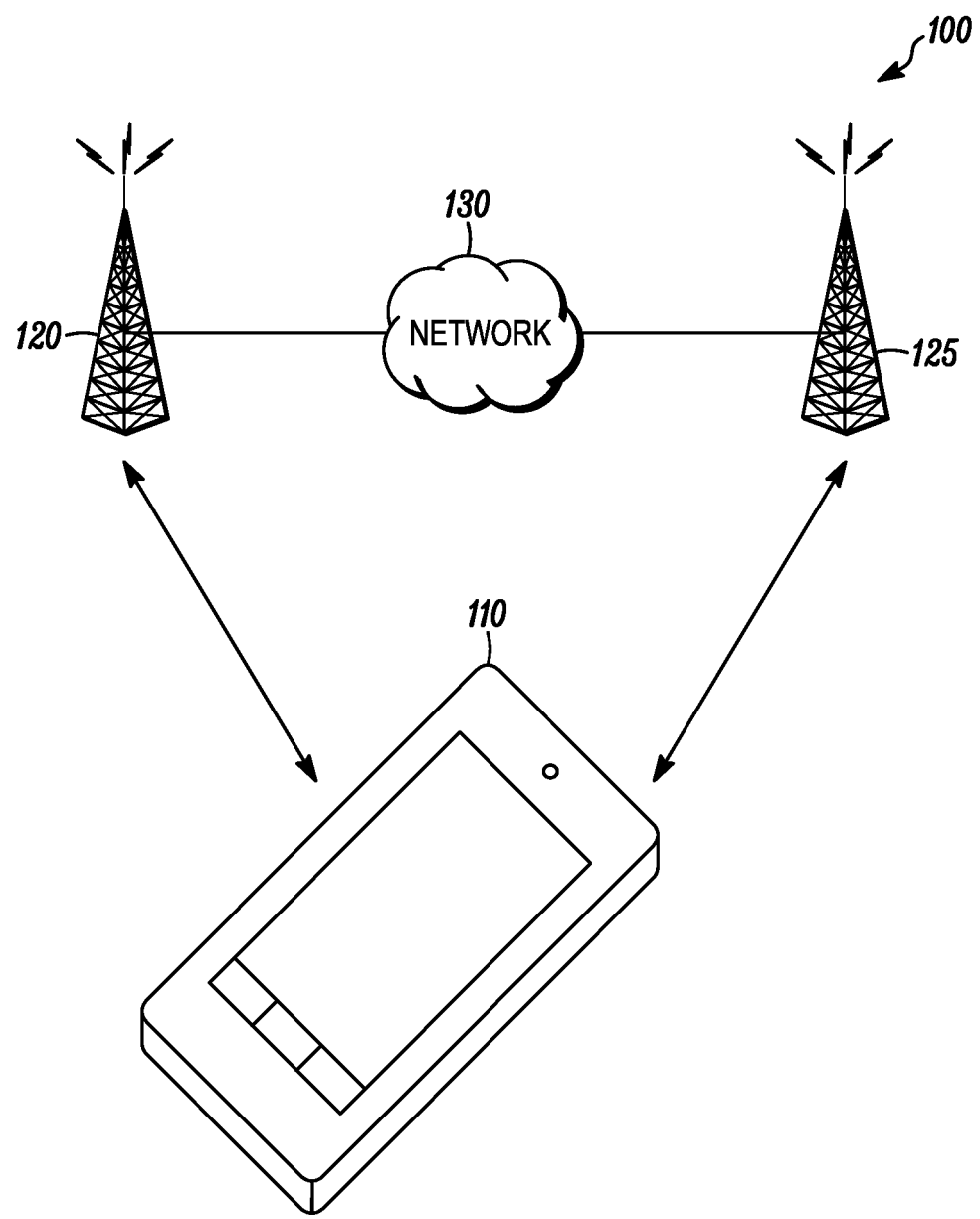
FIG. 1 is an example block diagram of a system according to a possible embodiment.

FIG. 1 is an example block diagram of a system 100 according to a possible embodiment. The system 100 can include a UE 110, at least one network entity 120 and 125, and a network 130. The UE 110 can be a wireless wide area network device, a user device, a wireless terminal, a portable wireless communication device, a smartphone, a cellular telephone, a flip phone, a personal digital assistant, a smartwatch, a personal computer, a tablet computer, a laptop computer, a selective call receiver, an Internet of Things (IoT) device, or any other user device that is capable of sending and receiving communication signals on a wireless network. The at least one network entity 120 and 125 can be a wireless wide area network base station, can be a NodeB, can be an enhanced NodeB (eNB), can be a New Radio (NR) NodeB (gNB), such as a Fifth Generation (5G) NodeB, can be an unlicensed network base station, can be an access point, can be a base station controller, can be a network controller, can be a Transmission and Reception Point (TRP), can be a different type of network entity from the other network entity, and/or can be any other network entity that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a NR network, a 3rd Generation Partnership Project (3GPP)-based network, a 5G network, a satellite communications network, a high altitude platform network, the Internet, and/or other communications networks.

In operation, the UE 110 can communicate with the network 130 via at least one network entity 120. For example, the UE 110 can send and receive control signals on a control channel and user data signals on a data channel.

One of potential physical layer operations for URLLC can be to support more than one Physical Uplink Control Channel (PUCCH) transmission from a UE for Hybrid Automatic Repeat Request (HARD)-Acknowledgement (ACK) feedback within a slot. Non-slot based scheduling and multiple HARQ-ACK feedback opportunities within a slot can reduce HARQ-ACK round trip time (RTT) for URLLC.

At least some embodiments can provide methods to support more than one PUCCH for HARQ-ACK transmission within a slot. At least some embodiments can also provide methods to support at least two HARQ-ACK codebooks simultaneously constructed, intended for supporting different service types for a UE. At least some embodiments can also provide methods to support handling of Uplink (UL) data/control and control/control resource collision, such as a method to address resource collision between a Scheduling Request (SR) associating to high-priority traffic and uplink data of lower-priority traffic for the cases where Medium Access Control (MAC) determines the prioritization. The methods to support handling of UL data/control and control/control resource collision can also include prioritization and/or multiplexing behavior among HARQ-ACK/SR/Channel State Information (CSI) and PUSCH for traffic with different priorities, including the cases with Uplink Control Information (UCI) on PUCCH and UCI on PUSCH.

According to Technical Specification (TS) 38.214 V15.4.0, a UE can be higher-layer configured with a list of up to M Transmission Configuration Index (TCI)-State configurations to decode PDSCH intended for the UE in a serving cell, where M can depend on the UE capability.

Each TCI-State can contain parameters for configuring a quasi-co-location relationship between one or two downlink reference signals and the DM-RS ports of the PDSCH. The quasi co-location relationship can be configured by the higher layer parameter qcl-Type1 for the first DL RS, and qcl-Type2 for the second DL RS, if configured. For the case of two DL RSs, the QCL types may not be the same, regardless of whether the references are to the same DL RS or different DL RSs. The quasi co-location types corresponding to each DL RS are given by the higher layer parameter qcl-Type in QCL-Info and may take one of the following values:
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

Rules can be specified to transmit different UCI in PUCCH and/or PUSCH. One rule to transmit different UCI in PUCCH and/or PUSCH can include multiple PUCCH based CSI reports in a slot with dropping and multiplexing rules for multiple CSI reports. For example, if a UE is not provided multi-CSI-PUCCH-ResourceList or if PUCCH resources for transmissions of CSI reports do not overlap in a slot, a long PUCCH carrying a CSI report (i.e. PUCCH format 3 & 4) can be time-domain multiplexed with a short PUCCH carrying a CSI report (i.e. PUCCH format 2) in the slot. If the UE is provided multi-CSI-PUCCH-ResourceList and if any of the multiple PUCCH resources overlap, the UE can multiplex all CSI reports in a resource from the resources provided by multi-CSI-PUCCH-ResourceList.

Another rule to transmit different UCI in PUCCH and/or PUSCH can include PUCCH and/or PUSCH overlapping with PUCCH and/or PUSCH resources that do not meet timing conditions. For example, a UE may not expect a PUCCH or a PUSCH that is in response to a DCI format detection to overlap with any other PUCCH or PUSCH that does not satisfy specified timing conditions.

Another rule to transmit different UCI in PUCCH and/or PUSCH can include transmission of HARQ-ACK and CSI in multiple PUCCHs. For example, if a UE is not provided simultaneousHARQ-ACK-CSI and if the UE would transmit HARQ-ACK information in a long PUCCH (PUCCH format 1, 3, or 4) in a given slot, the UE may not transmit a long PUCCH for CSI reports (PUCCH format 3 or 4) and the UE may not transmit overlapping short PUCCH for CSI report (PUCCH format 2) in the slot. As another example, if the UE is not provided simultaneousHARQ-ACK-CSI and if the UE would transmit HARQ-ACK information with PUCCH format 0 or PUCCH format 2, the UE may not transmit any PUCCH with PUCCH format 2, PUCCH format 3, or PUCCH format 4 for transmission of CSI reports, if they overlap with any resource from the resources for transmission of HARQ-ACK information.

Another rule to transmit different UCI in PUCCH and/or PUSCH can include UCI multiplexing on a PUSCH with Uplink-Shared Channel (UL-SCH). For example, a UE can multiplex HARQ-ACK information and/or CSI reports in a PUSCH if the PUCCH resource overlaps in time with a PUSCH transmission, and may not transmit SR. In case the PUCCH resource overlaps in time with multiple PUSCH transmissions, the PUSCH for multiplexing HARQ-ACK information and/or CSI is selected based on given criteria. If the PUSCH transmission by the UE is not in response to a DCI format detection and the UE multiplexes only CSI reports, the timing conditions may not be applicable. As another example, the UE may not expect the resource to overlap with a second resource of a PUCCH transmission over multiple slots if the resource is obtained from a group of resources that do not overlap with the second resource.

Another rule to transmit different UCI in PUCCH and/or PUSCH can include conditions on when PUSCH without UL-SCH overlaps with a PUCCH including positive SR on a serving cell, that can be based on Table 1, where the symbol "*" in SR means SR is positive.

TABLE 1

| SP-CSI on PUCCH without UL-SCH | A-CSI-only on PUSCH without UL-SCH | HARQ-ACK | SR | UE behaviour |
|---|---|---|---|---|
|  | * |  | * | Drop A-CSI-only on PUSCH, transmit SR on PUCCH. |
|  | * | * | * | Drop A-CSI-only on PUSCH, transmit SR and HARQ-ACK on PUCCH. |
| * |  |  | * | Drop SP-CSI on PUSCH, transmit SR on PUCCH |
| * |  | * | * | Drop SP-CSI on PUSCH, transmit HARQ-ACK and SR on PUCCH |

For timing conditions, if a UE would transmit multiple overlapping PUCCHs in a slot or overlapping PUCCH(s) and PUSCH(s) in a slot, and when the UE can be configured to multiplex different UCI types in one PUCCH, and at least one of the multiple overlapping PUCCHs or PUSCHs can be in response to a DCI format detection by the UE, the UE can multiplex all corresponding UCI types if the following conditions are met. If one of the PUCCH transmissions or PUSCH transmissions is in response to a DCI format detection by the UE, the UE can expect that the first symbol $S_0$ of the earliest PUCCH or PUSCH, among a group overlapping PUCCHs and PUSCHs in the slot, satisfies the following timeline conditions, where different variables can be defined in TS 38.213.

One timeline condition can be that $S_0$ is not before a symbol with Cyclic Prefix (CP) starting after $T_{proc,1}^{max} = (N_1+d_{1,1}+1) \cdot (2048+144) \cdot \kappa \cdot 2^{-\mu} \cdot T_C$ after a last symbol of any corresponding PDSCH, where µcorresponds to the smallest SCS configuration among the SCS configuration of the PDCCH scheduling the PDSCH, the SCS configuration of the PDSCH, and the smallest SCS configuration for the group of overlapping PUCCHs and PUSCHs where the UE transmits HARQ-ACK information in response to the reception of the PDSCH.

Another timeline condition can be that $S_0$ is not before a symbol with CP starting after $T_{proc,release}^{max}=(N+1)\cdot(2048+144)\cdot\kappa\cdot 2^{-\mu}\cdot T_C$ after a last symbol of any corresponding SPS PDSCH release, where N is described in Subclause 10.2 of TS 38.213 and μ corresponds to the smallest SCS configuration among the SCS configuration of the PDCCH providing the SPS PDSCH release and the smallest SCS configuration for the group of overlapping PUCCHs or overlapping PUCCHs and PUSCHs where the UE transmits HARQ-ACK information in response to the detection of the SPS PDSCH release.

Another timeline condition can be if there is no aperiodic CSI report multiplexed in a PUSCH in the group of overlapping PUCCHs and PUSCHs, $S_0$ is not before a symbol with CP starting after $T_{proc,2}^{max}=\max((N_2+d_{2,1}+1)\cdot(2048+144)\cdot\kappa\cdot 2^{-\mu}\cdot T_C, d_{2,2})$ after a last symbol of a PDCCH with the DCI format scheduling the PUSCH and any PDCCH scheduling a PDSCH or SPS PDSCH release with corresponding HARQ-ACK information in an overlapping PUCCH in the slot where μ corresponds to the smallest SCS configuration among the SCS configuration of the PDCCHs and the smallest SCS of the overlapping PUCCHs and PUSCHs, and $d_{2,1}=d_{2,2}=0$ if there is no overlapping PUSCH.

Another timeline condition can be if there is an aperiodic CSI report multiplexed in a PUSCH in the group of overlapping PUCCHs and PUSCHs, $S_0$ is not before a symbol with CP starting after $T_{proc,CSI}^{max}=\max((Z+d)\cdot(2048+144)\cdot\kappa\cdot 2^{-\mu}\cdot T_C, d_{22})$ after a last symbol of a PDCCH with the DCI format scheduling the PUSCH, and any PDCCH scheduling a PDSCH or SPS PDSCH release with corresponding HARQ-ACK information in an overlapping PUCCH in the slot where μ corresponds to the smallest SCS configuration among the SCS configuration of the PDCCHs, the smallest SCS configuration for the group of the overlapping PUCCHs and PUSCHs, and the smallest SCS configuration of aperiodic CSI-RS associated with the DCI format scheduling the PUSCH, and d=2 for μ=0,1, d=3 for μ=2 and d=4 for μ=3.

Another timeline condition can be $N_1$, $N_2$ $d_{1,1}$, $d_{2,1}$ $d_{2,2}$, and Z are defined in TS 38.214, and κ and $T_C$ are defined in TS 38.211.

If a UE would transmit multiple overlapping PUCCHs in a slot or overlapping PUCCH(s) and PUSCH(s) in a slot, one of the PUCCHs includes HARQ-ACK information in response to an SPS PDSCH reception, and any PUSCH is not in response to a DCI format detection, the UE can expect that the first symbol $S_0$ of the earliest PUCCH or PUSCH satisfies the first of the previous timeline conditions with the exception that components associated to a SCS configuration for a PDCCH scheduling a PDSCH or a PUSCH are absent from the timeline conditions.

At least some embodiments can provide a URLLC PUCCH/PUSCH overlapping with a PUSCH/PUCCH. According to a possible embodiment, if a URLLC PUCCH resource for URLLC HARQ-ACK information, a URLLC CSI report, and/or a URLLC SR or a URLLC PUSCH/PUCCH resource overlaps in time with a non-URLLC PUSCH (with or without UL-SCH) or a non-URLLC PUCCH transmission, wherein the non-URLLC PUSCH/PUCCH starts earlier than the URLLC PUCCH/PUSCH and does not satisfy the timing conditions described in Subclause 9.2.5 of 3GPP TS38.213 while the first symbol $S_0$ of the URLLC PUCCH/PUSCH satisfies the timing condition described in Subclause 9.2.5 of TS38.213, a UE can transmit the URLLC PUCCH/PUSCH and may not transmit the non-URLLC PUSCH/PUCCH.

If the non-URLLC PUSCH/PUCCH transmission has already been started, the UE may not expect to cancel the non-URLLC PUSCH/PUCCH transmission in symbols, relative to a last symbol of a CORESET where the UE detects a DCI format requesting the URLLC PUCCH/PUSCH transmission (e.g. URLLC HARQ-ACK feedback, URLLC CSI reporting), after a number of symbols that is smaller than a first number of symbols. In one example, a duration for the first number of symbols can correspond to the PUSCH preparation time $T_{proc,2}$, defined in 3GPP Rel-15 TS 38.214, for the most stringent PUSCH processing capability that the UE supports in a given cell. In another example, the duration for the first number of symbols can correspond to the PUSCH preparation time $T_{proc,2}$ for the PUSCH processing capability that the UE is configured to use in a given cell.

According to a possible implementation, if the non-URLLC PUSCH/PUCCH transmission has already been started, the UE can cancel, such as may not transmit, the non-URLLC PUSCH/PUCCH transmission, starting from a symbol that is a number of symbols equal to the PUSCH preparation time $T_{proc,2}$ for the corresponding PUSCH timing capability after a last symbol of a CORESET where the UE detects the DCI format requesting the URLLC PUCCH/PUSCH transmission. This implementation can be combined with other conditions. For example, the UE can perform this implementation if a duration between the start of the URLLC PUCCH/PUSCH and the end of the non-URLLC PUSCH/PUCCH transmission is longer than a certain threshold value, e.g. x percentage of the non-URLLC PUSCH/PUCCH duration or y number of symbols. That is, if the portion of the non-URLLC PUSCH/PUCCH that needs to be cancelled is large, the non-URLLC PUSCH/PUCCH can be cancelled as soon as possible for UE power saving. The threshold value can be RRC-configured or dynamically selected from a set of configured values and can be indicated by a network entity or derived by the UE based on the duration of the non-URLLC PUSCH/PUCCH.

According to another possible implementation, if the non-URLLC PUSCH/PUCCH transmission has already been started, the UE can cancel, such as may not transmit, the non-URLLC PUSCH/PUCCH transmission, starting from a symbol where the URLLC PUCCH resource transmission starts. This implementation can be combined with other conditions. For example, the UE can perform this implementation if a duration between the start of the URLLC PUCCH and the end of the non-URLLC PUSCH/PUCCH transmission is shorter than a certain threshold value, e.g. x percentage of the non-URLLC PUSCH/PUCCH duration or y number of symbols. That is, if the portion of the non-URLLC PUSCH/PUCCH that needs to be cancelled is small, the non-URLLC PUSCH/PUCCH can be transmitted as much as possible to minimize the impact on the demodulation performance of the non-URLLC PUSCH/PUCCH.

According to another possible implementation, if the non-URLLC PUSCH/PUCCH transmission has already been started, if frequency hopping for the non-URLLC PUSCH/PUCCH is enabled and if the time-domain overlapping URLLC PUCCH/PUSCH is within one or a couple of hops of the non-URLLC PUSCH/PUCCH, the UE can transmit a hop of the non-URLLC PUSCH/PUCCH that does not overlap with the URLLC PUCCH/PUSCH. This can be used to transmit some of non-URLLC HARQ-ACK information even when resource overlapping occurs if the non-URLLC HARQ-ACK information are multiplexed in the non-URLLC PUSCH such that the non-URLLC HARQ- ACK channel bits are partitioned and transmitted in each frequency hop of the non-URLLC PUSCH in a self-decodable manner.

At least some embodiments can provide multiple HARQ-ACK transmissions within a slot. According to a possible embodiment, if a UE detects a first DCI format, where the first DCI format schedules a URLLC PDSCH reception or a URLLC SPS PDSCH release and where the first DCI format indicates a first resource for a first PUCCH transmission with corresponding first HARQ-ACK information in a slot, where the UE previously detected a second DCI format scheduling a PUSCH transmission in the slot and the UE multiplexes second HARQ-ACK information in the PUSCH transmission, at least one of the following cases can be used. For example, the UE can transmit a HARQ-ACK in response to receiving a DCI format indicating SPS PDSCH release.

According to a first possible case, the PUSCH can be a URLLC PUSCH and the first PUCCH can overlap in time with the PUSCH in the slot. In a possible implementation, the UE may not expect to detect a DCI format scheduling a URLLC PDSCH reception or a URLLC SPS PDSCH release and indicating a resource for a PUCCH transmission with corresponding URLLC HARQ-ACK information overlapping with a URLLC PUSCH in a slot if the UE previously detected a DCI format scheduling the URLLC PUSCH transmission in the slot and if the UE multiplexes HARQ-ACK information in the URLLC PUSCH transmission.

According to a second possible case, the PUSCH can be a URLLC PUSCH or a non-URLLC PUSCH and the first PUCCH may not overlap in time with the PUSCH in the slot. The UE can transmit both the first PUCCH including the first HARQ-ACK information and the PUSCH including the second HARQ-ACK information in the slot.

According to a third possible case, the PUSCH can be a non-URLLC PUSCH and the first PUCCH can overlap in time with the PUSCH in the slot. In a possible implementation, the UE can include the first and second HARQ-ACK information in the first PUCCH and can transmit the first PUCCH. The UE may not transmit, or can cancel, the PUSCH transmission. In one example, the UE can perform this implementation if the UE is not in power-limited condition and accordingly, can transmit the first PUCCH with increased number of resource blocks. In possible implementation, the UE can transmit the first PUCCH with the first HARQ-ACK information, but without including the second HARQ-ACK information. The UE may not transmit, or can cancels, the PUSCH transmission. In one example, the UE can perform this implementation if the UE is in power-limited condition. To avoid the ambiguity between a network entity and the UE, the UE can determine whether to include the second HARQ-ACK information or not in the first PUCCH based on the latest reported power headroom report. In other implementation, the network entity can indicate to the UE whether to multiplex second HARQ-ACK information in the first PUCCH.

At least some embodiments can provide HARQ-ACK mapping on PUSCH for a UE supporting URLLC PUCCH/PUSCH. According to a possible embodiment, if a UE supporting URLLC PUCCH/PUSCH transmission (carrying URLLC HARQ-ACK information, a URLLC CSI report, and/or a URLLC SR) multiplexes HARQ-ACK information on a PUSCH and if frequency hopping is enabled for the PUSCH, the coded HARQ-ACK bits can be partitioned in a self-decodable manner and each set of the self-decodable HARQ-ACK channel bits can be transmitted in each frequency hop of the PUSCH.

At least some embodiments can provide HARQ-ACK feedback for a PDSCH with multi-Transmission and Reception Point (TRP) based Transport Block (TB) repetition. According to a possible embodiment, if a UE receives more than one codeword (e.g. 2 codewords) in a PDSCH, where the more than one codeword are transmitted from different TRPs with multiple TCI states and are encoded from a same TB, the UE can generate extended HARQ-ACK feedback information by including a preferred TCI state in addition to indication of (un)-successful decoding of the TB and can transmit the extended HARQ-ACK feedback information. In one example, for 2 codewords generated from one TB, 2 bit HARQ-ACK information indicates one of the following:

00: Acknowledgement (ACK), if the TB is successfully decoded;
    01: Non-Acknowledgement (NACK), a first TCI state is preferred;
    11: NACK, a second TCI state is preferred; or
    10: NACK, both the first and the second TCI states are preferred The above extended HARQ-ACK feedback information can be used to indicate short-term channel blocking of a certain TRP to a network entity immediately. By indicating that a particular TCI state from two TCI states is preferred rather than both of the TCI states, the UE can implicitly indicate temporarily poor channel condition of one TCI state.

Figure 2:
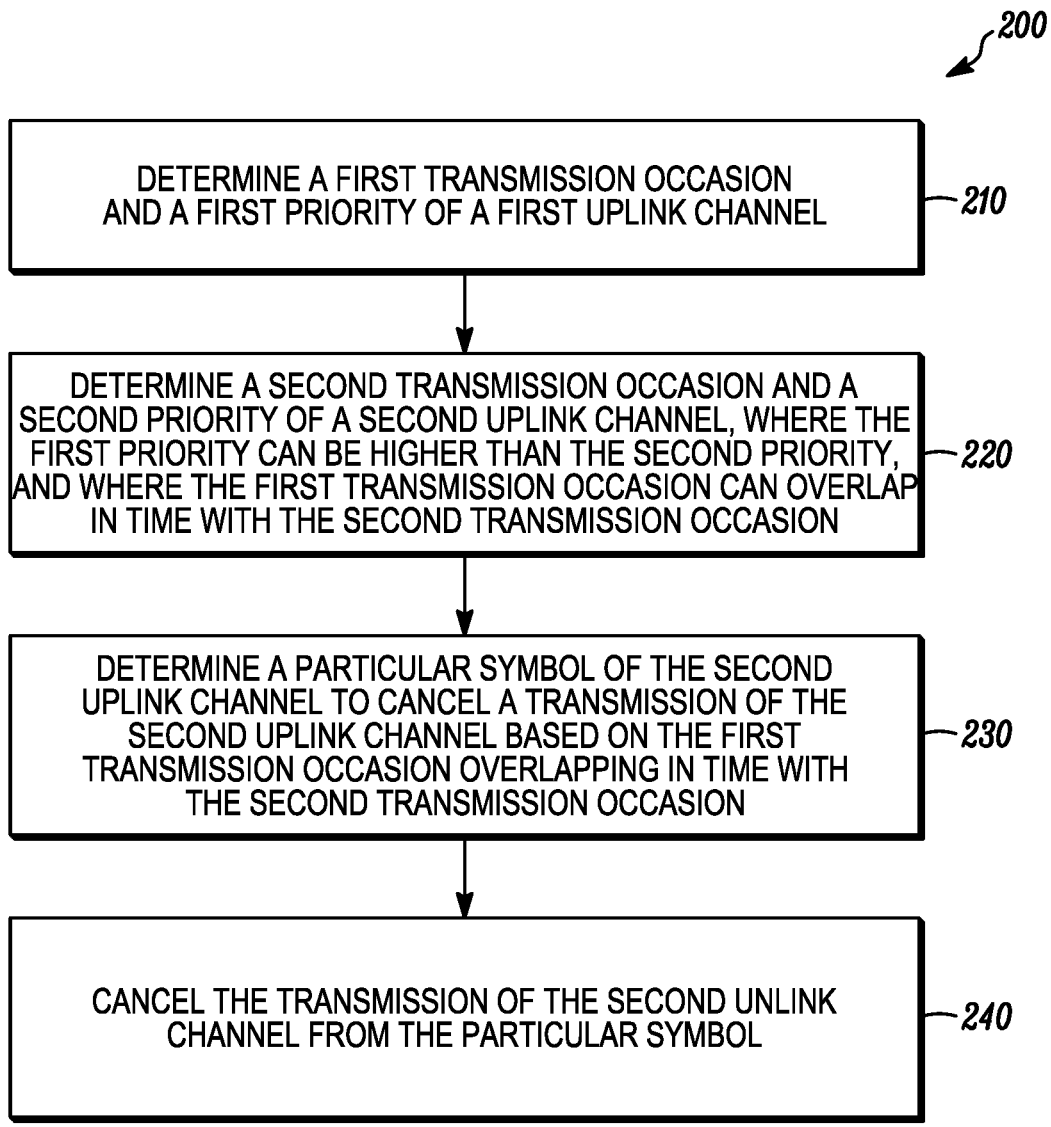
FIG. 2 is an example flowchart illustrating the operation of a wireless communication device according to a possible embodiment.

FIG. 2 is an example flowchart 200 illustrating the operation of a wireless communication device, such as the UE 110, according to a possible embodiment. At 210, a first transmission occasion and a first priority of a first uplink channel can be determined. The first uplink channel can be a first physical uplink channel. The first uplink channel can include URLLC data and/or URLLC UCI. For example, the UE can transmit/communicate URLLC data/UCI on/via the first uplink channel. The first uplink channel can carry URLLC data/UCI.

At 220, a second transmission occasion and a second priority of a second uplink channel can be determined. The second uplink channel can be a second physical uplink channel. The first priority can be higher than the second priority. The first transmission occasion can at least partially overlap in time with the second transmission occasion. The second transmission occasion can start earlier than the first transmission occasion.

A URLLC PUSCH/PUCCH can be equivalent to a high priority uplink channel carrying high priority traffic. A non-URLLC PUSCH/PUCCH can be equivalent to a low priority uplink channel carrying low priority traffic.

At 230, a particular symbol of the second uplink channel to cancel the transmission of the second uplink channel can be determined. According to a possible embodiment, a DCI format including scheduling information for the first uplink channel can be detected and the particular symbol can be determined at least based on timing related to detecting the DCI format.

At 240, the transmission of the second uplink channel from the particular symbol can be cancelled. Cancelling the transmission of the second uplink channel from the particular symbol can include stopping the transmission of the second uplink channel from the particular symbol. The particular symbol may not be a beginning symbol of the second uplink channel. For example, the transmission of the second uplink channel can be stopped after it has already started.

According to a possible embodiment, a start time of the particular symbol can be not later than a start time of the first transmission occasion. According to a possible embodiment, the particular symbol may not be a beginning symbol of the second uplink channel. For example, the UE may not be able to perform simultaneous transmissions of the first and second uplink channels. Thus, cancellation of the second uplink channel may not be later than the start time of the first transmission occasion.

According to a possible embodiment, the particular symbol can be determined based on a PUSCH timing capability. If the first uplink channel is dynamically scheduled via a PDCCH carrying the DCI format, the start time of cancellation can be determined based on the timing of DCI detection and the PUSCH timing capability.

According to a possible embodiment, the first uplink channel can be a PUCCH carrying first HARQ-ACK information. The second uplink channel can be a PUSCH carrying at least second HARQ-ACK information. The second HARQ-ACK information can be multiplexed with the first HARQ-ACK information in the first uplink channel. For example, embodiments can provide for multiple HARQ-ACK transmissions within a slot. According to a possible embodiment, a number of resource blocks used for transmitting the PUCCH transmission comprising the first HARQ-ACK information and the second HARQ-ACK information can be larger than a number of resource blocks used for transmitting the PUCCH transmission comprising only the first HARQ-ACK information. According to a possible implementation, the number of resource blocks for the PUCCH transmission can be determined based on UCI payload size. For example, the number of resource blocks for the PUCCH transmission can increase with a larger payload size.

According to a possible implementation, the first HARQ-ACK information can have higher priority than the second HARQ-ACK information. For example, the first HARQ-ACK can be a URLLC HARQ-ACK and the second HARQ-ACK can be a non-URLLC HARQ-ACK.

According to a possible implementation, an indication can be received. The indication can indicate to multiplex the second HARQ-ACK information with the first HARQ-ACK information in the first uplink channel. For example, the network entity can indicate to the UE whether to multiplex second HARQ-ACK information in the first PUCCH.

According to a possible implementation, a determination can be made as to whether the UE is in a power-limited condition. The second HARQ-ACK information can be multiplexed by multiplexing the second HARQ-ACK information with the first HARQ-ACK information in the first uplink channel in response to determining that the UE is not in the power-limited condition.

For example, the number of RBs for the first uplink channel may increase if the second HARQ-ACK is multiplexed in the first uplink channel. The larger number of RBs for an uplink transmission can require higher transmit power than the smaller number of RBs for the uplink transmission. If the UE is in a power-limited condition, such as when the required transmit power is higher than the max configured power, increasing the number of RBs may degrade demodulation performance. If the UE is not in power-limited condition, such as when the required transmit power is lower than the max configured power, increasing the number of RBs may not degrade demodulation performance.

As a further example, the UE can include the first and second HARQ-ACK information in the first PUCCH and can transmit the first PUCCH. The UE may not transmit or can cancel the PUSCH transmission. In one example, the UE can perform this implementation if the UE is not in power-limited condition and accordingly, can transmit the first PUCCH with increased number of resource blocks.

According to a possible embodiment, the particular symbol can be determined based on a number of symbols during a time duration between a start time of the first transmission occasion and an end time of the second transmission occasion. For example, the UE can cancel, such as not transmit, the non-URLLC PUSCH/PUCCH transmission, starting from a symbol where the URLLC PUCCH resource transmission starts. According to a possible example, the UE can perform this implementation if a duration between the start of the URLLC PUCCH and the end of the non-URLLC PUSCH/PUCCH transmission is shorter than a certain threshold value, such as x, percentage of the non-URLLC PUSCH/PUCCH duration or y number of symbols. That is, if the portion of the non-URLLC PUSCH/PUCCH that needs to be cancelled is small, the non-URLLC PUSCH/PUCCH can be transmitted as much as possible to minimize the impact on the demodulation performance of the non-URLLC PUSCH/PUCCH. According to a possible implementation, a time interval of the particular symbol can include a start time of the first transmission occasion if the number of symbols is less than a threshold value.

According to a possible embodiment, the second uplink channel can include a plurality of frequency hops. Each of the plurality of frequency hops can include a set of self-decodable coded HARQ-ACK bits. For example, if frequency hopping for the non-URLLC PUSCH/PUCCH is enabled and if the time-domain overlapping URLLC PUCCH/PUSCH is within one or a couple of hops of the non-URLLC PUSCH/PUCCH, the UE can transmit a hop of the non-URLLC PUSCH/PUCCH that does not overlap with the URLLC PUCCH/PUSCH. This can be used to transmit some of non-URLLC HARQ-ACK information even when resource overlapping occurs, if the non-URLLC HARQ-ACK information is multiplexed in the non-URLLC PUSCH such that the non-URLLC HARQ-ACK channel bits are partitioned and transmitted in each frequency hop of the non-URLLC PUSCH in a self-decodable manner.

According to a possible implementation, cancelling the transmission of the second uplink channel can include cancelling a transmission of a first at least one frequency hop of the second uplink channel. A third transmission occasion of the first at least one frequency hop can overlap in time with the first transmission occasion. A second at least one frequency hop of the second uplink channel can be transmitted. A fourth transmission occasion of the second at least one frequency hop may not overlap in time with the first transmission occasion.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 3:
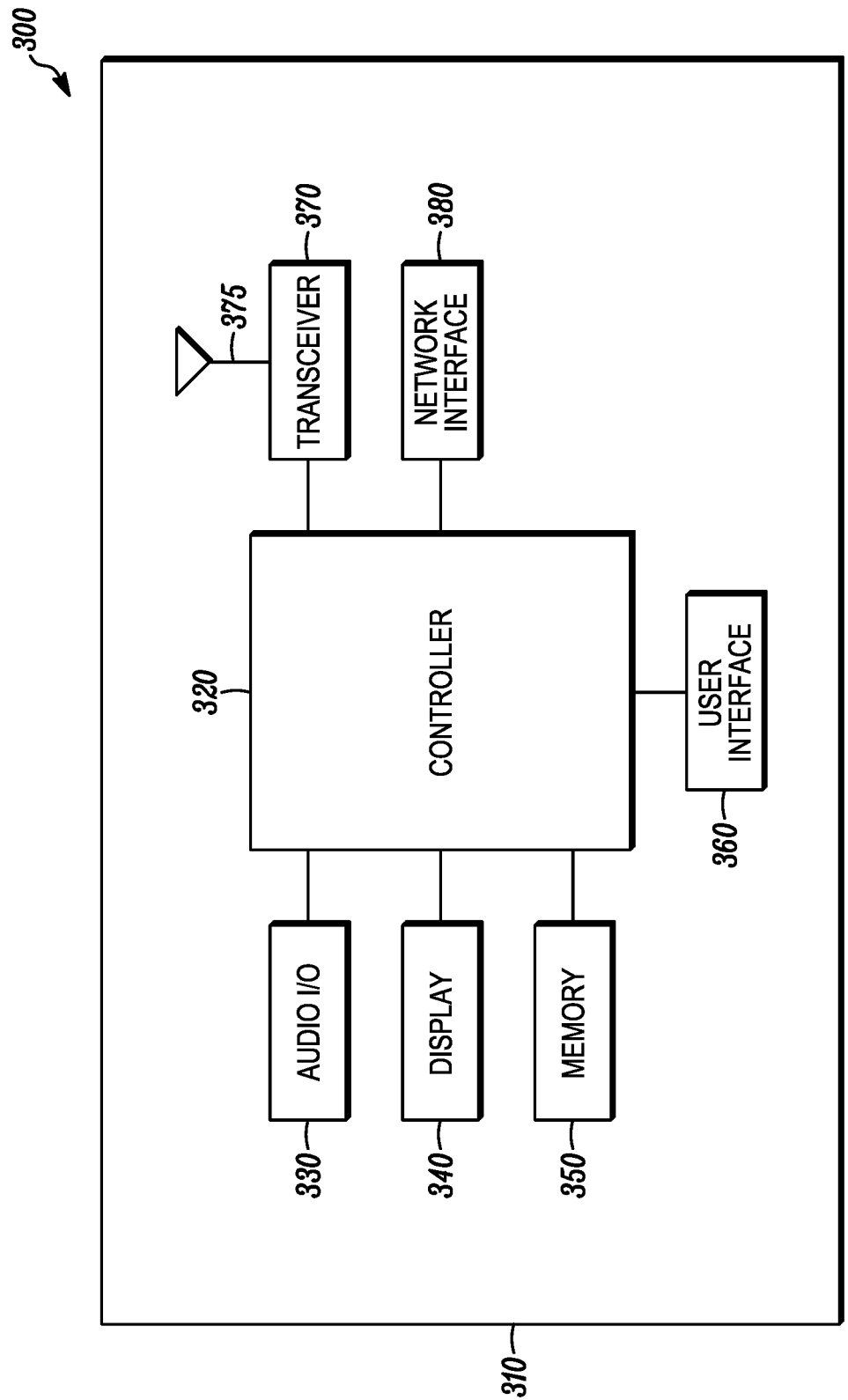
FIG. 3 is an example block diagram of an apparatus according to a possible embodiment.

FIG. 3 is an example block diagram of an apparatus 300, such as the UE 110, the network entity 120, or any other wireless communication device disclosed herein, according to a possible embodiment. The apparatus 300 can include a housing 310, a controller 320 coupled to the housing 310, audio input and output circuitry 330 coupled to the controller 320, a display 340 coupled to the controller 320, a memory 350 coupled to the controller 320, a user interface 360 coupled to the controller 320, a transceiver 370 coupled to the controller 320, at least one antenna 375 coupled to the transceiver 370, and a network interface 380 coupled to the controller 320. The apparatus 300 may not necessarily include all of the illustrated elements for different embodiments of the present disclosure. The apparatus 300 can perform the methods described in all the embodiments.

The display 340 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 370 can be one or more transceivers that can include a transmitter and/or a receiver. The audio input and output circuitry 330 can include a microphone, a speaker, a transducer, or any other audio input and output circuitry. The user interface 360 can include a keypad, a keyboard, buttons, a touch pad, a joystick, a touch screen display, another additional display, or any other device useful for providing an interface between a user and an electronic device. The network interface 380 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 350 can include a Random-Access Memory (RAM), a Read Only Memory (ROM), an optical memory, a solid-state memory, a flash memory, a removable memory, a hard drive, a cache, or any other memory that can be coupled to an apparatus.

The apparatus 300 or the controller 320 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 350, elsewhere on the apparatus 300, in cloud storage, and/or anywhere else that can store software and/or an operating system. The apparatus 300 or the controller 320 may also use hardware to implement disclosed operations. For example, the controller 320 may be any programmable processor. Furthermore, the controller 320 may perform some or all of the disclosed operations. For example, at least some operations can be performed using cloud computing and the controller 320 may perform other operations. At least some operations can also be performed computer executable instructions executed by at least one computer processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 320 may be any controller or processor device or devices capable of operating an apparatus and implementing the disclosed embodiments. Some or all of the additional elements of the apparatus 300 can also perform some or all of the operations of the disclosed embodiments.

In operation, the apparatus 300 can perform the methods and operations of the disclosed embodiments. The transceiver 370 can transmit and receive signals, including data signals and control signals that can include respective data and control information. The controller 320 can generate and process the transmitted and received signals and information.

In operation according to a possible embodiment, the transceiver 370 can communicate on a wireless communication network. The controller 320 can determine a first transmission occasion and a first priority of a first uplink channel. According to a possible embodiment, the first uplink channel can include URLLC data and/or URLLC uplink control information.

The controller 320 can determine a second transmission occasion and a second priority of a second uplink channel. The first priority can be higher than the second priority. According to a possible embodiment, the first transmission occasion can at least partially overlap in time with the second transmission occasion. According to a possible embodiment, the second transmission occasion can start earlier than the first transmission occasion.

The controller 320 can determine a particular symbol of the second uplink channel to cancel a transmission of the second uplink channel. The controller 320 can cancel the transmission of the second uplink channel from the particular symbol. According to a possible embodiment, cancelling the transmission of the second uplink channel from the particular symbol can include stopping the transmission of the second uplink channel from the particular symbol. The particular symbol can be not a beginning symbol of the second uplink channel. According to another possible embodiment, a start time of the particular symbol can be no later than a start time of the first transmission occasion. According to a possible embodiment, the particular symbol may not be a beginning symbol of the second uplink channel.

The controller 320 can detect a downlink control information format including scheduling information for the first uplink channel, and the particular symbol can be determined at least based on timing related to detecting the downlink control information format. According to a possible embodiment, the particular symbol is determined based on a physical uplink shared channel timing capability.

Figure 4:
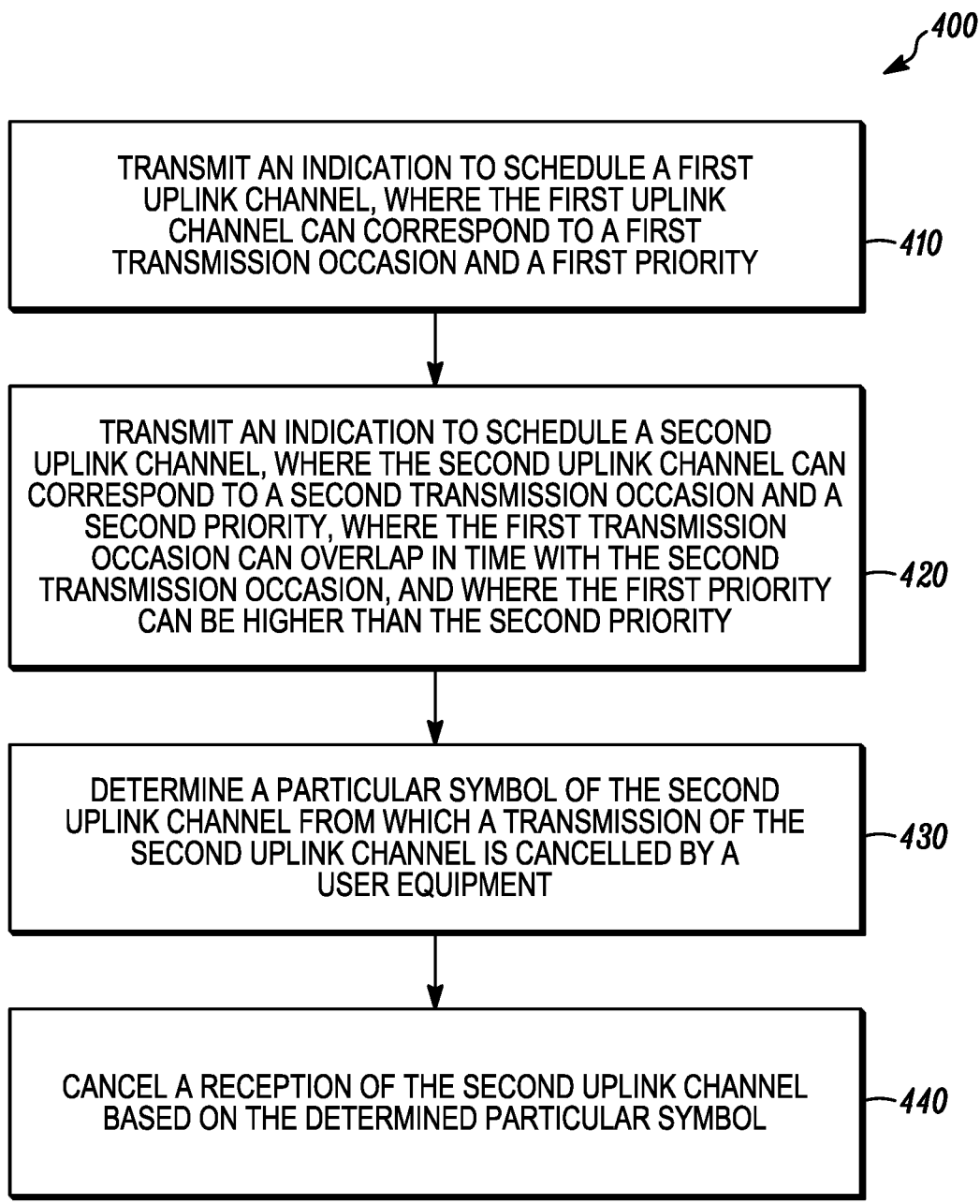
FIG. 4 is an example flowchart illustrating the operation of a wireless communication device according to a possible embodiment.

FIG. 4 is an example flowchart 400 illustrating the operation of a wireless communication device, such as the network entity 120, according to a possible embodiment. At 410, an indication to schedule a first uplink channel can be transmitted. The first uplink channel can correspond to a first transmission occasion and a first priority. At 420, an indication to schedule a second uplink channel can be transmitted. The second uplink channel can correspond to a second transmission occasion and a second priority. The first transmission occasion can overlap in time with the second transmission occasion. The first priority can be higher than the second priority.

At 430, a particular symbol of the second uplink channel from which a transmission of the second uplink channel is cancelled by a user equipment can be determined based on the first transmission occasion overlapping in time with the second transmission occasion. At 440, a reception of the second uplink channel can be cancelled based on the determined particular symbol.

According to a possible embodiment, it can be up to network entity implementation when the network entity exactly cancels reception of the second uplink channel. According to a possible example, the network entity can cease the reception of the second uplink channel from the particular symbol. According to another possible example, the network entity can cease the reception of the second uplink channel before the particular symbol.

According to a possible embodiment, the first uplink channel can include at least one of URLLC data and URLLC uplink control information.

According to a possible embodiment, the first transmission occasion can partially overlap in time with the second transmission occasion and the second transmission occasion can start earlier than the first transmission occasion.

According to a possible embodiment, the user equipment can stop transmission of the second uplink channel from the particular symbol, where the particular symbol may not be a beginning symbol of the second uplink channel.

According to a possible embodiment, a start time of the particular symbol can be no later than a start time of the first transmission occasion.

According to a possible embodiment, the indication to schedule the first uplink channel can be a DCI format including scheduling information for the first uplink channel, where the particular symbol can be determined at least based on timing related to transmitting the DCI format.

According to a possible embodiment, the particular symbol can be determined based on a PUSCH timing capability for the UE.

According to a possible embodiment, the first uplink channel can be a PUCCH carrying first HARQ-ACK information, the second uplink channel can be a PUSCH carrying at least second HARQ-ACK information, and the first and second HARQ-ACK information can be received in the first uplink channel.

According to a possible embodiment, the first HARQ-ACK information can have higher priority than the second HARQ-ACK information.

According to a possible embodiment, an indication can be transmitted. The indication can indicate to multiplex the second HARQ-ACK information with the first HARQ-ACK information in the first uplink channel.

According to a possible embodiment, a determination can be made as to whether the UE is in a power-limited condition. Receiving the first and second HARQ-ACK information can include receiving the first and second HARQ-ACK information in the first uplink channel in response to determining that the UE is not in the power-limited condition.

According to a possible embodiment, the particular symbol can be determined based on a number of symbols during a time duration between a start time of the first transmission occasion and an end time of the second transmission occasion.

According to a possible embodiment, a time interval of the particular symbol can include a start time of the first transmission occasion if the number of symbols is less than a threshold value.

According to a possible embodiment, the second uplink channel can include a plurality of frequency hops, where each of the plurality of frequency hops can include a set of self-decodable coded HARQ-ACK bits. According to a possible embodiment, cancelling the reception of the second uplink channel can include cancelling a reception of a first at least one frequency hop of the second uplink channel, where a third transmission occasion of the first at least one frequency hop can overlap in time with the first transmission occasion. A second at least one frequency hop of the second uplink channel can be received, where a fourth transmission occasion of the second at least one frequency hop may not overlap in time with the first transmission occasion.

According to a possible embodiment, if a UE detects a first DCI format scheduling a URLLC PDSCH reception or a URLLC SPS PDSCH release and indicating a first resource for a first PUCCH transmission with corresponding first HARQ-ACK information overlapping with a non-URLLC PUSCH in a slot, where the UE previously detected a second DCI format scheduling the non-URLLC PUSCH transmission in the slot and the UE multiplexes second HARQ-ACK information in the non-URLLC PUSCH transmission, the non-power limited UE can include the first and second HARQ-ACK information in the first PUCCH and transmits the first PUCCH. The UE may not transmit, or can cancel, the non-URLLC PUSCH transmission. The UE may not be in power-limited condition and accordingly, can transmit the first PUCCH with an increased number of resource blocks. If the UE is in power-limited condition, the UE can transmit the first PUCCH with the first HARQ-ACK information but without including the second HARQ-ACK information. To avoid the ambiguity between a network entity and the UE, the UE can determine whether to include the second HARQ-ACK information or not in the first PUCCH based on the latest reported power headroom report.

If a UE multiplexes HARQ-ACK information on a PUSCH and if frequency hopping is enabled for the PUSCH, the coded HARQ-ACK bits can be partitioned in a self-decodable manner and each set of the self-decodable HARQ-ACK channel bits can be transmitted in each frequency hop of the PUSCH. With this scheme, even when the part of PUSCH transmission (e.g. a first hop or a second hop) needs to be cancelled to avoid collision with a URLLC PUCCH/PUSCH, a part of HARQ-ACK information can still be transmitted.

According to at least some embodiments, a method can be performed in a UE. The method can include receiving downlink shared channel data that comprises URLLC data. The method can include determining a first transmission occasion to transmit a PUCCH transmission comprising at least first HARQ-ACK information in response to receiving the downlink shared channel data. The method can include receiving scheduling information for an uplink shared channel transmission that does not comprise URLLC data at a second transmission occasion, where the uplink shared channel can include a second HARQ-ACK information, and where the first transmission occasion can overlap with the second transmission occasion. The method can include determining to not transmit or to cancel the uplink shared channel transmission in response to the first transmission occasion overlapping with the second transmission occasion. The method can include determining whether the UE is in power-limited condition. The method can include, in response to determining the UE is not power-limited, transmitting the first PUCCH transmission including the first HARQ-ACK information and the second HARQ-ACK information. The method can include, in response to determining the UE is in power-limited condition, transmitting the first PUCCH transmission including only the first HARQ-ACK information.

According to a possible implementation, the number of resources used for transmitting the first PUCCH transmission can include the first HARQ-ACK information and the second HARQ-ACK information can be larger than the number of resources used for transmitting the first PUCCH transmission including only the first HARQ-ACK information.

According to at least some additional embodiments, a method can be performed in a UE. The method can include receiving a first codeword including a transport block associated with a first TCI state in a first transmission occasion. The method can include receiving a second codeword including the transport block associated with a second TCI state in a second transmission occasion, where the second transmission occasion can overlap with the first transmission occasion. The method can include determining HARQ-ACK feedback information in response to receiving the first codeword and the second codeword. The method can include transmitting at least one preferred TCI state for retransmission of the transport block in the HARQ-ACK feedback information in response to determining a NACK for the transport block.

According to a possible implementation, the first codeword can be transmitted from a first TRP and the second codeword can be transmitted for a second TRP. According to a possible implementation, the method can include determining the preferred TCI state among the first TCI state and second TCI state based on link quality on the received first codeword and second codeword, respectively. According to a possible implementation, the link quality can be based on one or more of a Signal to Interference plus Noise Ratio (SINR), a reference signal received power, a channel quality metric, a Log-Likelihood Ratio (LLR), and/or Mean Mutual Information (MMIB) associated with the codeword.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method in a user equipment, the method comprising:
   determining a first transmission occasion and a first priority of a first uplink channel;
   determining a second transmission occasion and a second priority of a second uplink channel, where the first priority is higher than the second priority, and where the first transmission occasion overlaps in time with the second transmission occasion;
   determining a particular symbol of the second uplink channel to cancel a transmission of the second uplink channel based on the first transmission occasion overlapping in time with the second transmission occasion; and
   cancelling the transmission of the second uplink channel from the particular symbol,
   wherein the method further comprises detecting a downlink control information format including scheduling information for the first uplink channel, and
   wherein the particular symbol is determined at least based on timing related to detecting the downlink control information format.

2. The method according to claim 1, wherein the first uplink channel comprises at least one of ultra-reliable low-latency communication data and ultra-reliable low-latency communication uplink control information.

3. The method according to claim 1,
   wherein the first transmission occasion partially overlaps in time with the second transmission occasion, and
   wherein the second transmission occasion starts earlier than the first transmission occasion.

4. The method according to claim 1, wherein cancelling the transmission of the second uplink channel from the particular symbol comprises stopping the transmission of the second uplink channel from the particular symbol, wherein the particular symbol is not a beginning symbol of the second uplink channel.

5. The method according to claim 1, wherein a start time of the particular symbol is no later than a start time of the first transmission occasion.

6. The method according to claim 1, wherein the particular symbol is determined based on a physical uplink shared channel timing capability.

7. The method according to claim 1, wherein the first uplink channel comprises a physical uplink control channel carrying first hybrid automatic repeat request acknowledgement information;
   wherein the second uplink channel comprises a physical uplink shared channel carrying at least second hybrid automatic repeat request acknowledgement information, and
   wherein the method further comprises multiplexing the second hybrid automatic repeat request acknowledgement information with the first hybrid automatic repeat request acknowledgement information in the first uplink channel.

8. The method according to claim 7, wherein the first hybrid automatic repeat request acknowledgement information has higher priority than the second hybrid automatic repeat request acknowledgement information.

9. The method according to claim 7, further comprising receiving an indication to multiplex the second hybrid automatic repeat request acknowledgement information with the first hybrid automatic repeat request acknowledgement information in the first uplink channel.

10. The method according to claim 7, further comprising determining whether the user equipment is in a power-limited condition,
wherein multiplexing the second hybrid automatic repeat request acknowledgement information comprises multiplexing the second hybrid automatic repeat request acknowledgement information with the first hybrid automatic repeat request acknowledgement information in the first uplink channel in response to determining that the user equipment is not in the power-limited condition.

11. The method according to claim 1, wherein the particular symbol is determined based on a number of symbols during a time duration between a start time of the first transmission occasion and an end time of the second transmission occasion.

12. The method according to claim 11, wherein a time interval of the particular symbol includes a start time of the first transmission occasion if the number of symbols is less than a threshold value.

13. The method according to claim 1, wherein the second uplink channel comprises a plurality of frequency hops, wherein each of the plurality of frequency hops comprises a set of self-decodable coded hybrid automatic repeat request acknowledgement bits.

14. The method according to claim 13, wherein cancelling the transmission of the second uplink channel comprises cancelling a transmission of a first at least one frequency hop of the second uplink channel, where a third transmission occasion of the first at least one frequency hop overlaps in time with the first transmission occasion, and
wherein the method further comprises transmitting a second at least one frequency hop of the second uplink channel, where a fourth transmission occasion of the second at least one frequency hop does not overlap in time with the first transmission occasion.

15. An apparatus comprising:
a transceiver that communicates on a wireless communication network; and
a controller coupled to the transceiver, where the controller
determines a first transmission occasion and a first priority of a first uplink channel,
determines a second transmission occasion and a second priority of a second uplink channel, where the first priority is higher than the second priority, and where the first transmission occasion overlaps in time with the second transmission occasion,
determines a particular symbol of the second uplink channel to cancel a transmission of the second uplink channel based on the first transmission occasion overlapping in time with the second transmission occasion, and
cancels the transmission of the second uplink channel from the particular symbol,
wherein the controller detects a downlink control information format including scheduling information for the first uplink channel, and
wherein the particular symbol is determined at least based on timing related to detecting the downlink control information format.

16. The apparatus according to claim 15,
wherein the first transmission occasion partially overlaps in time with the second transmission occasion, and
wherein the second transmission occasion starts earlier than the first transmission occasion.

17. The apparatus according to claim 15, wherein a start time of the particular symbol is no later than a start time of the first transmission occasion.

18. The apparatus according to claim 15, wherein the particular symbol is determined based on a physical uplink shared channel timing capability.

* * * * *